United States Patent [19]
Whitted, III et al.

[11] Patent Number: 5,515,521
[45] Date of Patent: May 7, 1996

[54] CIRCUIT AND METHOD FOR REDUCING DELAYS ASSOCIATED WITH CONTENTION INTERFERENCE BETWEEN CODE FETCHES AND OPERAND ACCESSES OF A MICROPROCESSOR

[75] Inventors: Graham B. Whitted, III, Irvine; Hsiao-Shih Chang, Orange; James A. Kane, Newport Beach, all of Calif.

[73] Assignee: Meridian Semiconductor, Inc., Irvine, Calif.

[21] Appl. No.: 193,287

[22] Filed: Feb. 8, 1994

[51] Int. Cl.⁶ .............................. G06F 12/08; G06F 9/38
[52] U.S. Cl. .................. 395/403; 395/375; 395/421.03; 364/DIG. 1; 364/DIG. 2; 364/243.41; 364/263.1
[58] Field of Search .................................. 395/425, 500, 395/375, 457, 467, 478, 414, 403, 464, 474, 496, 421.03; 364/DIG. 1, 200 MS File, 900 MS File

[56] References Cited

U.S. PATENT DOCUMENTS

| | | |
|---|---|---|
| 4,847,753 | 7/1989 | Matsuo et al. .......................... 395/375 |
| 5,023,828 | 6/1991 | Grundmann et al. ................... 395/375 |
| 5,170,476 | 12/1992 | Laakso et al. ......................... 395/467 |
| 5,230,068 | 7/1993 | Van Dyke et al. ..................... 395/375 |
| 5,241,644 | 8/1993 | Nomuru et al. ........................ 395/250 |
| 5,345,580 | 9/1994 | Tamaru et al. ......................... 395/500 |
| 5,448,705 | 9/1995 | Nguyen et al. ......................... 395/375 |

*Primary Examiner*—Matthew M. Kim
*Attorney, Agent, or Firm*—Knobbe, Martens, Olson & Bear

[57] ABSTRACT

An access control unit for a microprocessor receives fetch requests and operand access requests from a CPU of the microprocessor, and issues the requests to a bus/cache unit in a manner which reduces interference between fetch requests and operand access requests. Fetch addresses for fetch requests that cannot be immediately performed by the bus/cache unit are placed in a fetch address queue, allowing such fetch requests to be postponed. Operand access requests received by the access control unit are performed prior to postponed fetch requests. Thus, the execution unit of the CPU can continue to execute instructions which require operand accesses without waiting for pending fetch requests to be performed. Fetch requests that have been postponed by the access control unit are attempted on every clock cycle for which no operand access request is pending.

28 Claims, 9 Drawing Sheets

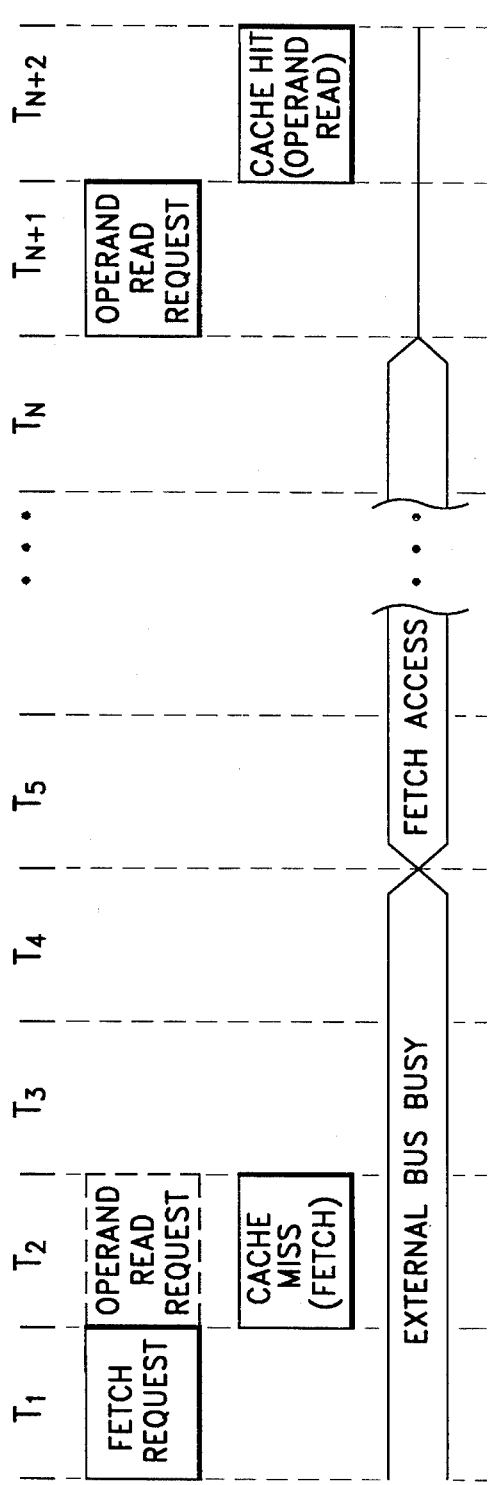
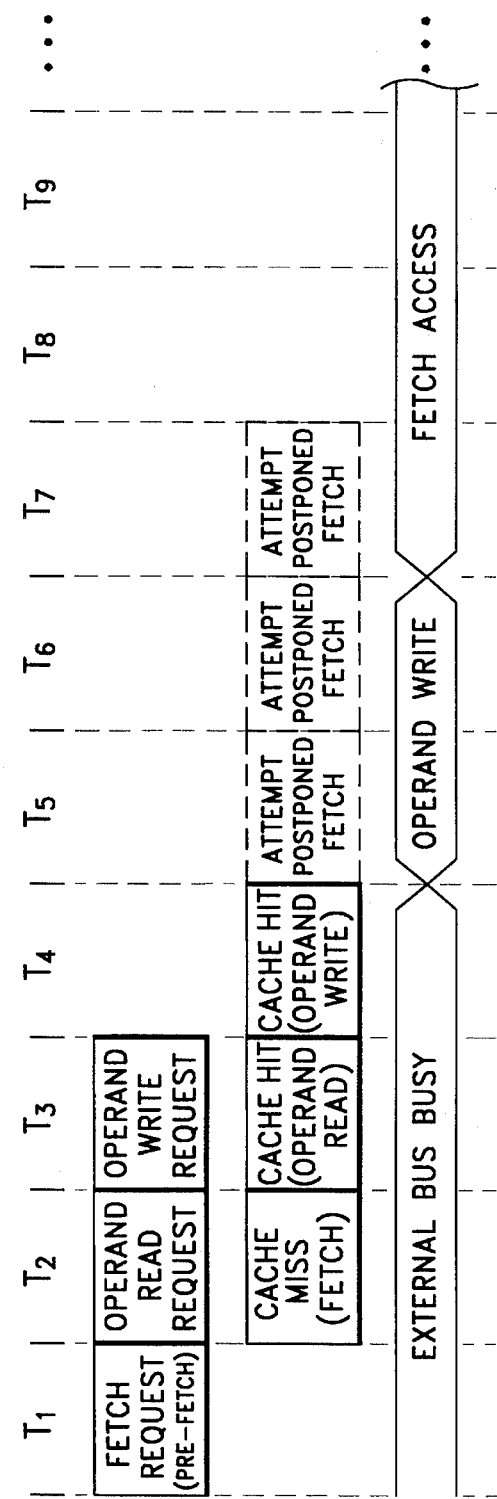
Fig. 2 (PRIOR ART)
Fig. 5

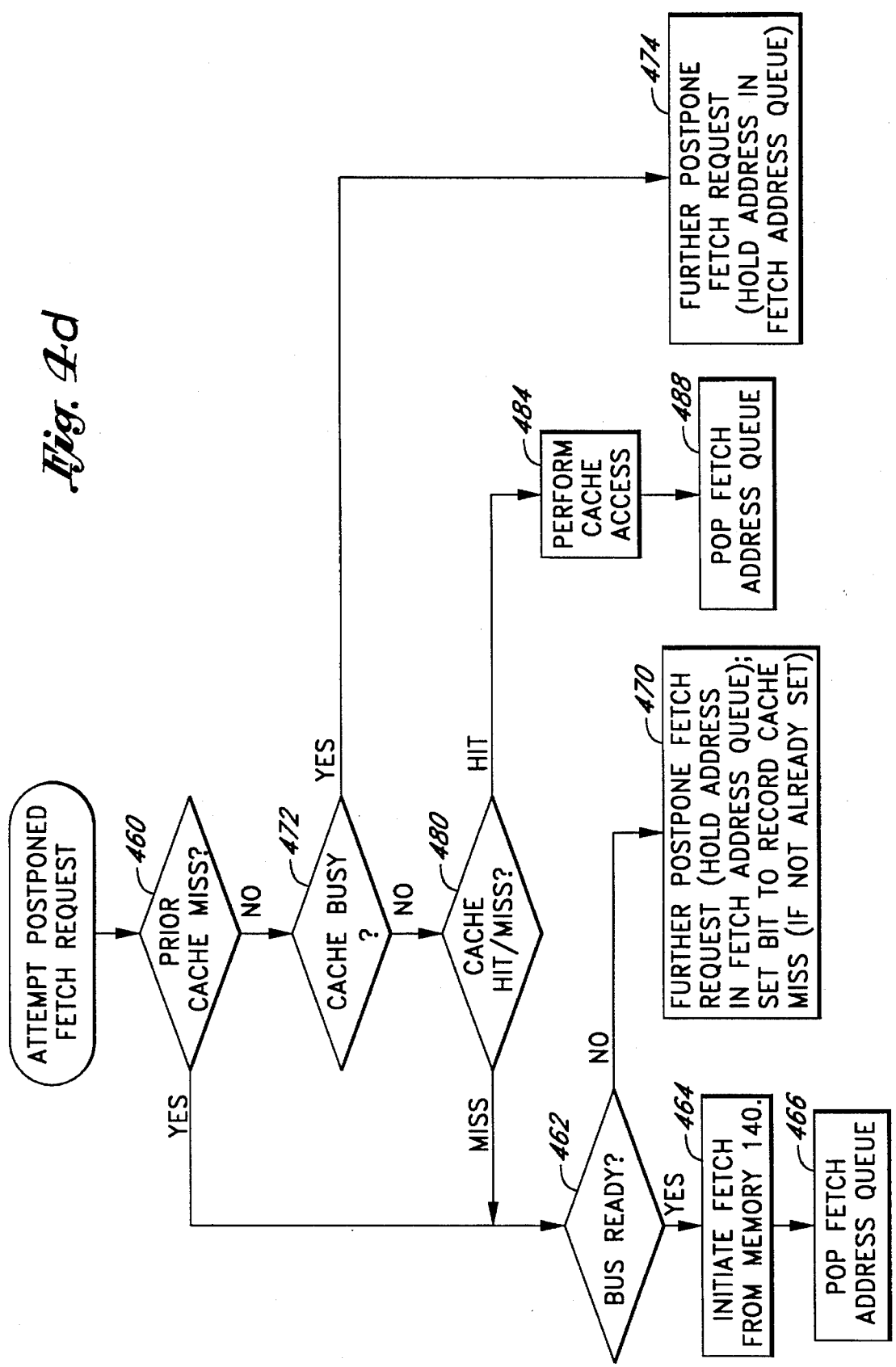

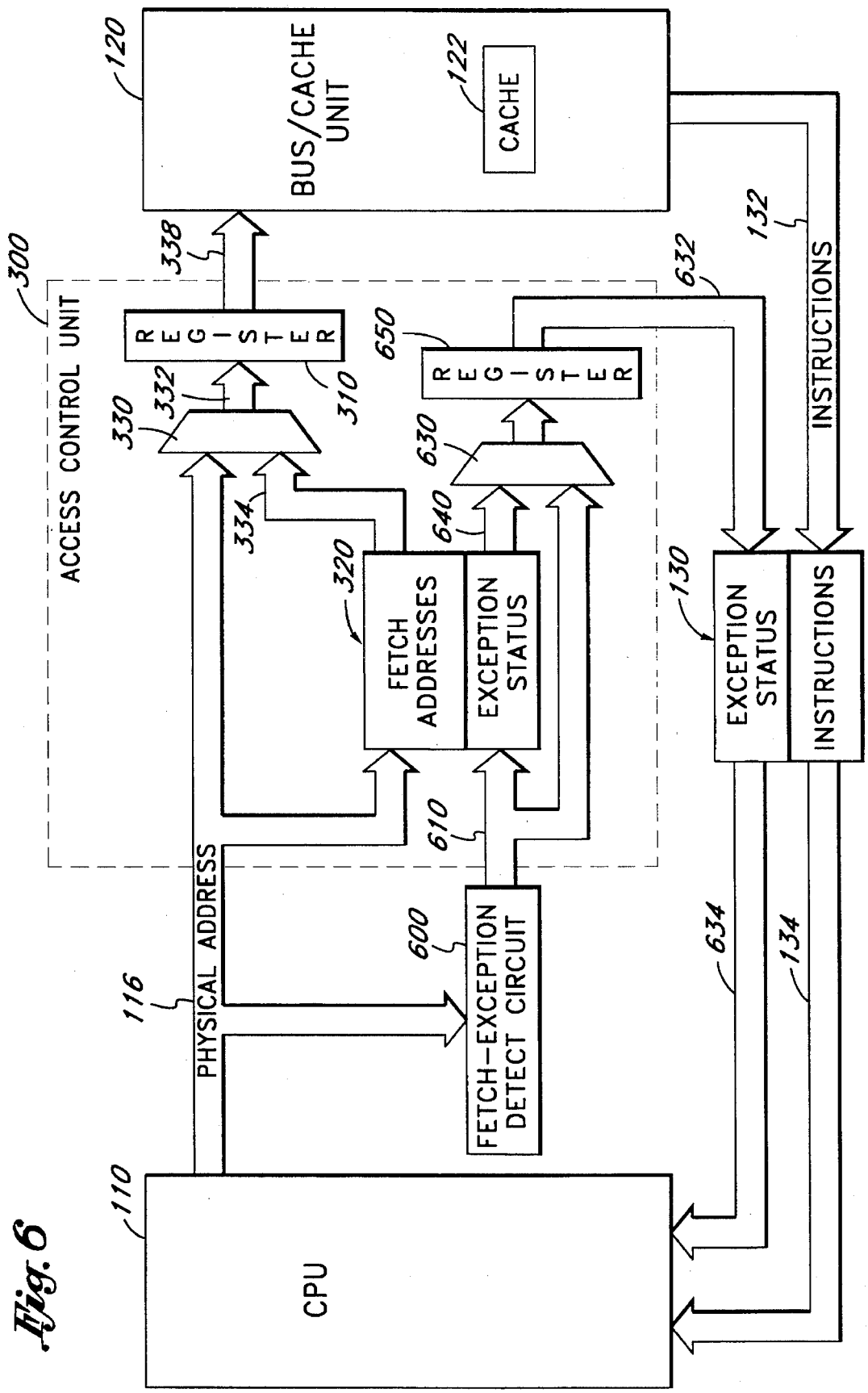

CIRCUIT AND METHOD FOR REDUCING DELAYS ASSOCIATED WITH CONTENTION INTERFERENCE BETWEEN CODE FETCHES AND OPERAND ACCESSES OF A MICROPROCESSOR

FIELD OF THE INVENTION

This invention relates to microprocessors. In particular, this invention relates to a microprocessor for which code and data are stored together in a common memory circuit and method for controlling accesses to cache and external memory so as to reduce delays caused by contention interference between code fetches and operand accesses.

BACKGROUND OF THE INVENTION

During normal program execution microprocessors access an external memory for the purpose of retrieving instructions or "code" from memory, and also for the purpose of performing operations involving data or "operands." Memory reads of code, or "fetches," are performed automatically by the microprocessor in response to program execution. Operand accesses are performed in response to execution by the microprocessor of individual instructions.

Fetches are commonly performed in fixed-size blocks of code (e.g., 16 bytes, 32 bytes, etc.). These blocks of code are read from external memory (or cache) and buffered within the microprocessor for subsequent execution. Three types of fetch operations are commonly performed by microprocessors. The first type is a "pre-fetch," which involves the fetching of instructions immediately "downstream" in memory from the instruction being executed. The second type is a "conditional fetch" which is performed when a conditional branch or jump instruction is executed by the microprocessor, causing program execution to begin at a new address. The third type is an "unconditional fetch," which is performed when an unconditional branch or jump instruction is executed.

To perform either a fetch or an operand access, a central processing unit (CPU) of the microprocessor issues a command or "request" to a bus/cache unit of the microprocessor, specifying the type of access to perform. These access requests are typically in the form of a predetermined bit-field of a micro-instruction generated by the CPU. The CPU also generates an address which specifies a memory location for performing the access. For fetches, the address ("fetch address") typically specifies the starting location of the block of code to be fetched. For operand accesses, the address ("operand address") specifies one or more byte locations for performing either a read or a write operation. In either case, the address generated by the CPU is passed to the bus/cache unit along with the corresponding request, and the bus/cache unit performs the specified operation.

For microprocessors that support a virtual memory scheme, addresses generated by the CPU are "virtual addresses" which alone do not identify unique memory locations. Virtual addresses are translated into "physical addresses" (i.e., addresses which correspond to physical memory locations) before being passed to the bus/cache unit. Virtual addresses generated by the CPU may additionally be modified by an addressing unit of the microprocessor before being passed to the bus/cache unit.

Microprocessors are typically designed for use with a single external memory which is shared by both code and data. For this type of design, known as a "pure Von Neumann Architecture" design, the use of the external memory bus by the CPU must be partitioned between a fetch unit of the CPU, which generates fetch requests, and an execution unit of the CPU, which generates operand access requests. Since both types of accesses cannot be performed to external memory simultaneously, the operation of either the fetch unit or the execution unit normally must be suspended when both units have pending access requests. This interference between fetches and operand accesses has the undesirable effect of slowing down program execution. Once the CPU issues a fetch request to the bus/cache unit, the execution unit normally must wait for the fetch access to finish before it can complete execution of an instruction requiring an operand access.

One solution to this problem has been to use two separate external memories, one for code and one for data, so that fetch accesses and operand accesses can be performed simultaneously. This type of design, known as a "pure Harvard Architecture" design, significantly increases the number of pins and the complexity of the microprocessor, since two separate sets of address, data and control lines must be provided by the microprocessor. Thus, pure Harvard Architecture microprocessors provide a solution to the interference problem, but at a very high cost.

The use of a cache memory (cache) internal to the microprocessor helps to reduce interference between fetches and operand accesses. Cache is a form of high-speed memory used by microprocessors to buffer a copy of data and instructions likely to be used by the CPU. When the CPU generates a fetch request or an operand read request, the bus/cache unit initially checks the cache to determine whether the requested instructions or data reside in the cache. If the requested instructions or data are found in cache (referred to as a "cache hit"), the requested instructions or data are returned to the CPU without accessing external memory. If the requested instructions or data are not found in cache (referred to as a "cache miss"), the microprocessor must perform a read from external memory before returning the requested instructions or data. Various algorithms exist for updating the instructions and data held by the cache in order to achieve a high hit rate and to thus reduce the frequency at which the microprocessor must access external memory.

Since only one cache access can be performed at a time, interference between fetch requests and operand access requests exists even when the microprocessor runs strictly out of cache. However, since cache access times are normally considerably lower than access times for external memory, the operation of the CPU is suspended for shorter durations of time when interference between fetch and operand requests occurs. Thus, the use of a single, unified cache for both instructions and data reduces the effect of interference between fetch requests and operand access requests.

To further reduce interference between fetch requests and operand access requests, some microprocessors employ separate caches for code and data. This microprocessor design, which may be referred to as a Harvard Architecture style design, enables the CPU to fetch instructions from an instruction cache while simultaneously accessing operands in a data cache.

Although the use of two separate caches can provide a significant increase in performance over microprocessors having a single cache, the addition of the second cache increases the complexity of the microprocessor. By way of example, a microprocessor having a 2k byte data cache and a 2k byte instruction cache requires considerably more logic than an identical microprocessor having a single, unified cache of 4k bytes for both code and data. As a result, a number of microprocessor manufacturers have opted to use a single unified cache.

As indicated by the foregoing, the design choice between the use of a single, unified cache (referred to as Von Neumann Architecture style designs) and the use of separate data and instruction caches (Harvard Architecture style designs) involves two competing design goals. Harvard Architecture style designs provide for reduced interference between fetches and operand accesses, but at the cost of increasing the amount of microprocessor circuitry.

The present invention is directed to a circuit and method for reducing interference between fetches and operand accesses to cache and external memory for Von Neumann style microprocessors. The general objective of the invention is to obtain some of the performance advantages offered by Harvard Architecture style microprocessors without adding a second cache.

SUMMARY OF THE INVENTION

The present invention relates to an access control unit for a microprocessor and a corresponding method for handling fetch requests and operand requests issued by a CPU. The invention is directed to a Von Neumann style microprocessor which has a single, unified cache for data and code.

The access control unit receives memory access commands (fetch requests and operand access requests) and corresponding addresses from the CPU, and issues the memory access commands and addresses to a bus/cache unit of the microprocessor to be attempted. Fetch requests that cannot immediately be performed are postponed in order to allow any operand access requests to be performed without unnecessarily suspending the operation of the CPU. Postponed fetch requests are then performed when no operand accesses are pending. Performance benefits similar to those achievable by use of a second cache are thereby achieved without adding a second cache.

The preferred embodiment of the access control unit includes a fetch address queue that holds fetch addresses for postponed fetch requests, a multiplexer that selects between an address from the CPU and an address from the fetch address queue, an address register connected to the output of the multiplexer that holds addresses for accesses to be attempted on the following clock cycle, and a state machine. The state machine receives memory access commands from the CPU, and determines whether the accesses should be attempted on the following clock cycle or postponed for a subsequent clock cycle. Operand accesses are always attempted on the following clock cycle.

When the CPU issues a fetch request, the state machine determines either that the fetch should be attempted on the following clock cycle, or that the fetch should be postponed. If the state machine determines that the fetch request should be postponed it pushes the fetch address onto the fetch address queue. To determine whether or not the fetch should be postponed, the state machine evaluates the type of fetch request being issued (pre-fetch, conditional fetch or unconditional fetch), whether any fetch addresses are currently in the fetch address queue, the status of the cache, and the status of an external bus to memory.

In accordance with one aspect of the invention, there is thus provided an access control unit for a microprocessor. The microprocessor has a CPU which issues fetch requests and operand access requests to a bus unit to initiate accesses to memory, with each of the fetch requests including a fetch address which specifies a starting memory location for fetching a block of code into an instruction buffer of the microprocessor, and with each of the operand access requests including an operand address which specifies a memory location for performing an operand access. The access control unit comprises a fetch address queue that receives and holds a fetch address of a fetch request that has been issued by the CPU to allow the fetch request to be postponed while a subsequently-issued operand access request is performed by the bus unit. The access control unit also comprises an address selector that selects between at least an operand address from the CPU and the fetch address held by the fetch address queue, the operand address from the CPU corresponding to the subsequently-issued operand access request. An address selected by the address selector is provided to the bus unit, and specifies a next memory access request to be attempted by the bus unit. The access control unit further comprises a state machine that provides a control signal to the address selector to select either the operand address from the CPU or the fetch address held by the fetch address queue; the state machine thereby allows either the subsequently-issued operand access request or the fetch request to be attempted by the bus unit.

In accordance with another aspect of the invention, a fetch address queue is provided in a microprocessor for which both code and operand data are stored in a common external memory. The fetch address queue stores fetch addresses to allow corresponding fetch requests issued by a CPU of the microprocessor to be postponed, with the fetch requests specifying respective blocks of code to be loaded into an instruction buffer of the microprocessor by a bus unit of the microprocessor. The fetch requests are postponed in order to permit operand access requests issued by the CPU to be performed by the bus unit prior to postponed fetch requests. The fetch addresses are held by the fetch address queue until the corresponding fetch requests are performed or canceled. The fetch address queue thereby allows the CPU to access operand data without waiting for previously-issued fetch requests to be performed by the bus unit.

In accordance with another aspect of the invention, a method is provided for processing fetch requests and operand access requests issued by a CPU of a microprocessor so as to give priority to pending operand access requests over pending fetch requests. The microprocessor comprises a memory unit which accesses a cache memory and an external memory in response to the fetch requests and the operand access requests. The method comprises the following steps: (a) receiving a fetch request and a corresponding fetch address from the CPU, the fetch request and the corresponding fetch address identifying a block of code to be loaded into an instruction buffer of the microprocessor from either the cache memory or the external memory; (b) placing the fetch address in a fetch address queue of the microprocessor to postpone the fetch request if the cache memory is busy, or if the block of code is not in the cache memory and a bus to the external memory is busy; (c) receiving a current operand access request and a corresponding operand address from the CPU after the step of receiving the fetch request; (d) passing the operand access request and the corresponding operand address to the memory unit to be performed while holding the fetch address in the fetch address queue, thereby giving priority to the current operand access request over the fetch request; and (e) issuing the fetch address from the fetch address queue to the memory unit, to thereby allow the fetch request to be performed after the current operand access request has been performed.

In accordance with yet another aspect of the invention, a method is provided for performing code fetches and operand accesses such that code fetches do not cause an unnecessary suspension of instruction execution. The method is for use with a microprocessor for which code and operand data are stored in a common external memory, and for which portions of the code and operand data are stored in a common cache memory of the microprocessor. The method comprises the following steps: (a) generating a fetch request, the fetch request specifying a block of code to be read into an instruction buffer of the microprocessor from either the external memory or the cache memory; (b) attempting the fetch request by accessing the cache memory to determine whether the block of code can immediately be read from the cache memory, and, when the block of code cannot immediately be read from the cache memory, placing the fetch request in a state of postponement; (c) generating an operand access request, the operand access request specifying an operand to be written to or read from the external memory, the step of generating the operand access request occurring after step (a); and (d) performing the operand access request while maintaining the fetch request in the state of postponement, the step of performing the operand access request comprising accessing the external memory.

BRIEF DESCRIPTION OF THE DRAWINGS

FIG. 2 is a timing diagram for a prior art microprocessor, illustrating how instruction execution is suspended when a fetch request is followed by an operand access request;

FIG. 3b is a high-level block diagram of the access control unit of FIG. 3a;

FIG. 4d is a decision tree for the logic of the state machine of FIG. 3b that controls attempts of postponed fetch requests;

FIG. 5 is a timing diagram illustrating the operation of the access control unit; and FIG. 6 is a high-level block diagram of a microprocessor which includes an alternative embodiment of the access control unit of the present invention.

In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

Figure 1:
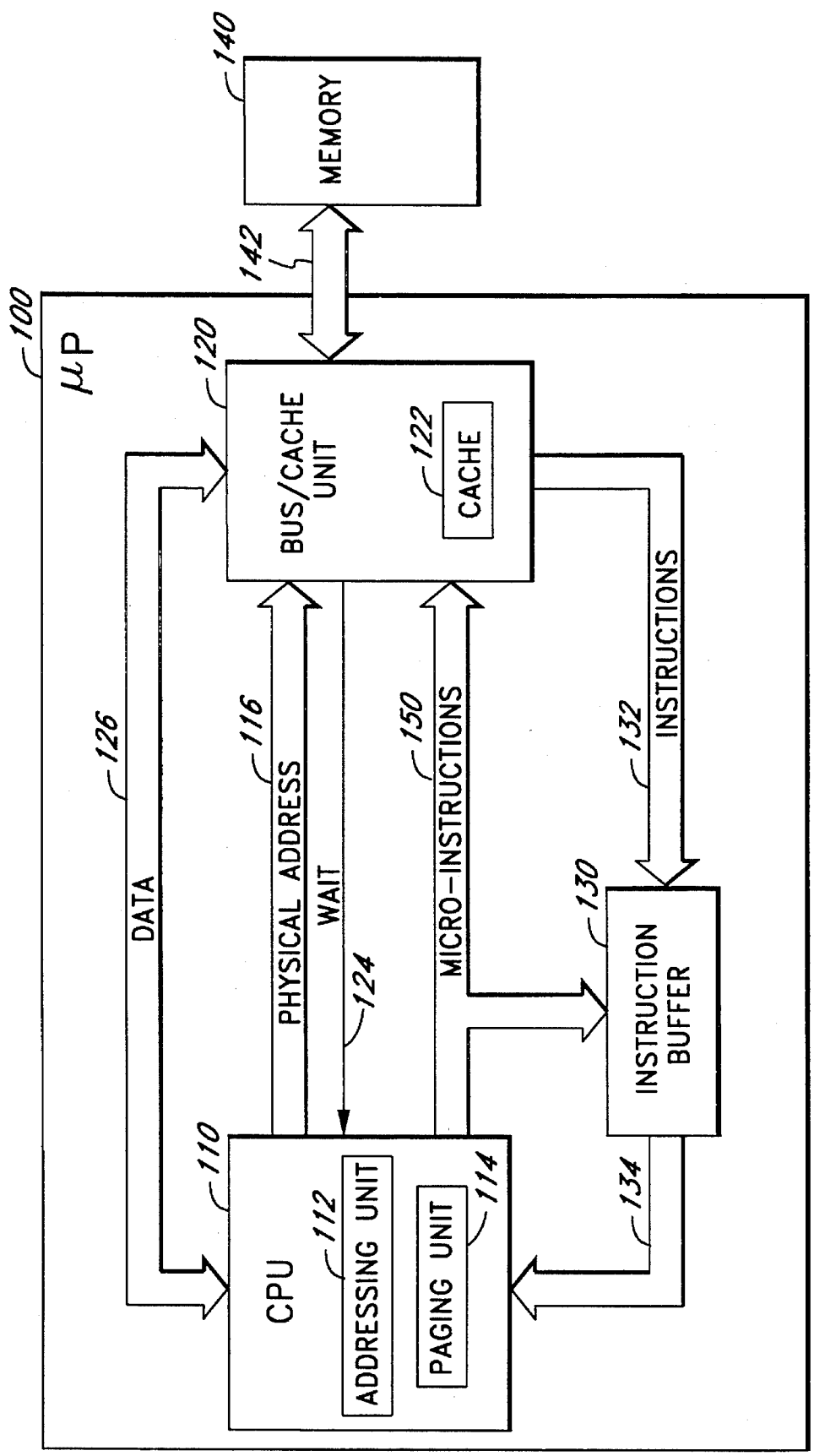
FIG. 1 is a high level block diagram of a prior art microprocessor to which the present invention may be applied.

The problem to which the present invention is directed is further described with reference to FIG. 1. FIG. 1 is a simplified, high-level block diagram of a prior art microprocessor 100 to which the present invention may be applied. The microprocessor 100 includes a CPU 110, a bus/cache unit 120, and an instruction buffer 130. The microprocessor 100 optionally includes an addressing unit 112 and a paging unit 114, which may be thought of as part of the CPU 110 (as shown) for purposes of this description and the description of the present invention which follows. The bus/cache unit 120 includes a single cache 122 for both instructions and data.

The CPU 110 is connected to the bus/cache unit 120 by a unidirectional address bus 116. The CPU 110 is also connected to the bus/cache unit 120 by a bi-directional data bus 126. The bus/cache unit 120 provides a WAIT signal to the CPU 110 on the line 124 to inform the CPU 110 of the status of certain requested operations.

The bus/cache unit 120 is connected to a system memory 140 ("memory") by an external bus 142. The bus/cache unit 120 is connected to the instruction buffer 130 by a bus 132. The output of the instruction buffer 130 is connected to the CPU 110 by a bus 134. The CPU provides micro-instructions to the bus/cache unit 120 and the instruction buffer 130 over a micro-instruction bus 150.

When instructions executed by the CPU 110 require the microprocessor 100 to access memory 140 (or cache 122), the CPU 110 issues an operand access request to the bus/cache unit 120 in the form of a micro-instruction on the bus 150. The CPU 110 also provides a physical operand address to the bus/cache unit 120 on the bus 116. The bus/cache unit 120 responds to the operand access request by checking the cache 122, and, if necessary, by performing the requested access on the bus 142. If subsequent instructions are dependent upon the completion of the operand access, the bus/cache unit 120 asserts a WAIT signal on the line 124 to suspend the operation of the CPU if necessary. Operand data read from or written to the memory 140 (or cache 122) is passed between the CPU 110 and the bus/cache unit 120 on the data bus 126.

The CPU 110 also issues fetch requests to the bus/cache unit 120 for the purpose of fetching instructions likely to be executed by the CPU 110. To issue a fetch-request, the CPU 110 generates the appropriate micro-instruction on the bus 150, and provides a physical fetch address on the bus 116 to specify a starting address for performing the fetch. The bus/cache unit 120 responds to the fetch request by reading the requested fetch-data from cache 122 or memory 140, and returning the fetch data to the instruction buffer 130 on the bus 132. Instructions held by the instruction buffer 130 are passed to the CPU 110 over the bus 134, unless a branch is taken by the CPU 110 requiring instructions held by the instruction buffer 130 to be discarded.

The problem associated with prior art (Van-Neumann architecture) microprocessors results from the fact that operand access requests and fetch requests are typically performed by the bus/cache unit 120 in sequential order, resulting in an unnecessarily high level of interference between operand accesses and fetch accesses. This problem is illustrated by FIG. 2. FIG. 2 is a timing diagram of a typical sequence of events which may occur when a fetch request is followed by an operand access request on the following clock cycle.

Referring to FIG. 2, during a first clock cycle $T_1$ the CPU 110 issues a fetch request to the bus/cache unit 120. During a second clock cycle $T_2$ the bus/cache unit 120 determines that the requested fetch data is not present in cache (cache miss). Also during the second clock cycle $T_2$, the CPU 110 determines that an operand read operation will be required. Depending upon the particular design, the CPU 110 may suspend issuance of the operand read request until the fetch access is complete (as shown), or alternatively may issue the operand read request during $T_2$ (as indicated by dashed lines). In either case, the bus/cache unit 120 will not perform the operand read until the fetch access has been completed. During the third and the fourth clock cycles $T_3$ and $T_4$ the bus/cache unit 120 is unable to perform the fetch access because the external bus 142 is busy. The external bus 142 may be busy during these cycles for a number of reasons. For example, a DMA (direct memory access) operation may be in progress, or the bus/cache unit 120 may be performing a previously-issued operand access request.

During the fifth clock cycle $T_5$, the external bus 142 becomes available, and the bus/cache unit 120 begins to perform the fetch access. The number of clock cycles required to perform the fetch will depend on a number of factors, including the number of bytes of fetch data being read and the width of the data path (not shown) of the external bus 142.

During the $N^{th}$ clock cycle $T_N$ the bus/cache unit 120 completes the fetch access. During the $(N+1)^{th}$ clock cycle $T_{N+1}$ the CPU 110 issues the operand read request to the bus/cache unit 120 that has been pending since the second clock cycle $T_2$. During the $(N+2)^{th}$ clock cycle $T_{N+2}$ the bus/cache unit 120 retrieves the operand read data from the cache 122, and returns the operand read data to the CPU on the data bus 126.

This example illustrates one possible situation in which an operand access is held up as a result of a fetch request. An operand access which potentially could have been issued during the second clock cycle $T_2$ and completed during the third clock cycle $T_3$ is unnecessarily suspended until the previously-issued fetch request is completed. Assuming that subsequent instructions are dependant upon this operand access, execution of these subsequent instructions must also be suspended until the operand read is completed.

FIG. 2 illustrates one of many possible scenarios in which the operation of the CPU 110 may be suspended due to interference between operand accesses and fetch accesses. One partial solution to such interference problems is to use separate data and instruction caches. The use of separate caches permits fetches and operand accesses to be performed simultaneously when some or all of the requested operand and fetch data resides in the respective caches. However, as discussed above, the use of two separate caches has the disadvantage of requiring the addition of a significant amount of logic to the microprocessor. Thus, it is desirable to provide a solution to the problem which does not require the addition of a separate cache.

Figure 3A:
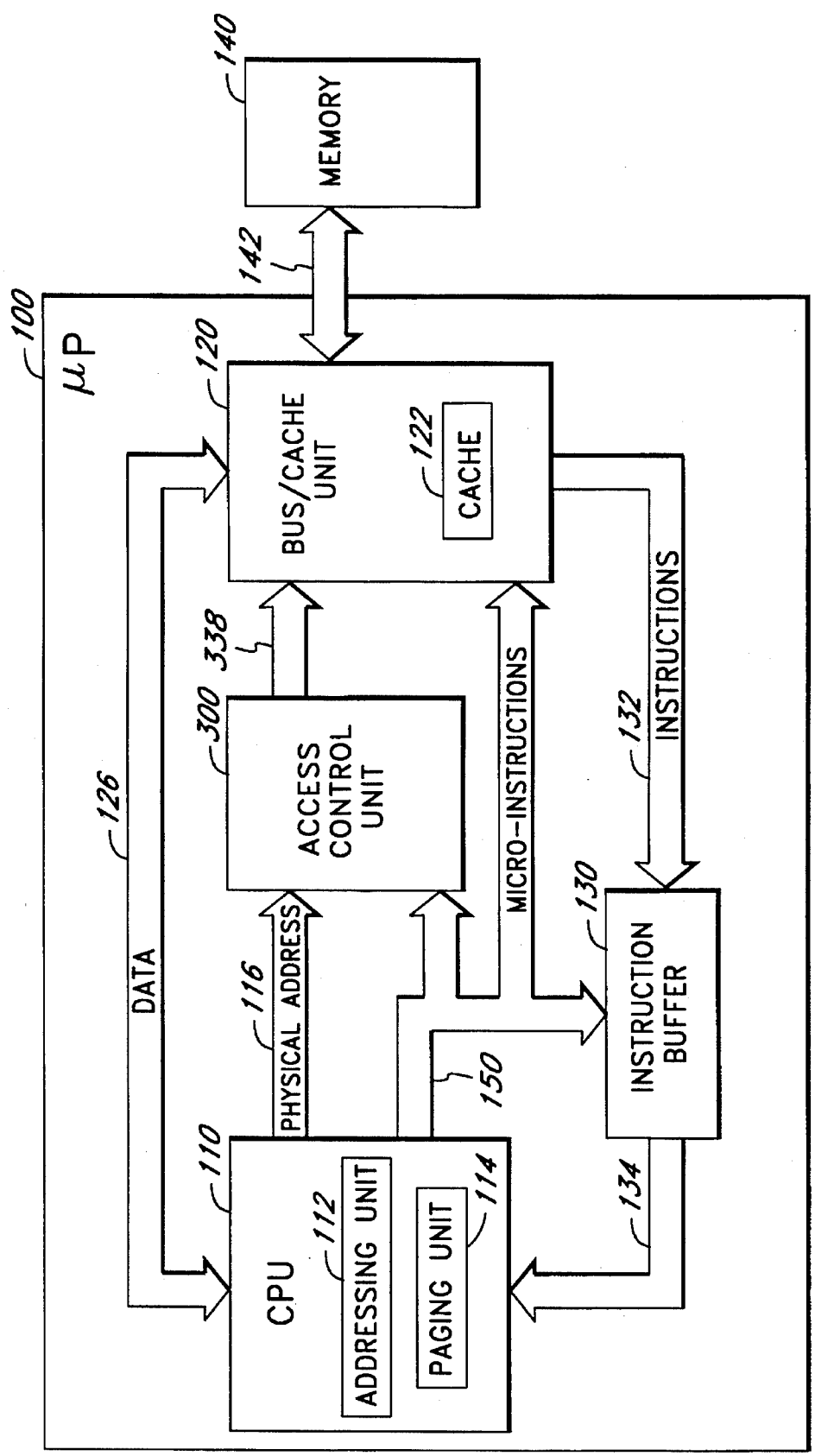
FIG. 3a is a high-level block diagram of a microprocessor which includes an access control unit of the present invention.
Figure 3B:
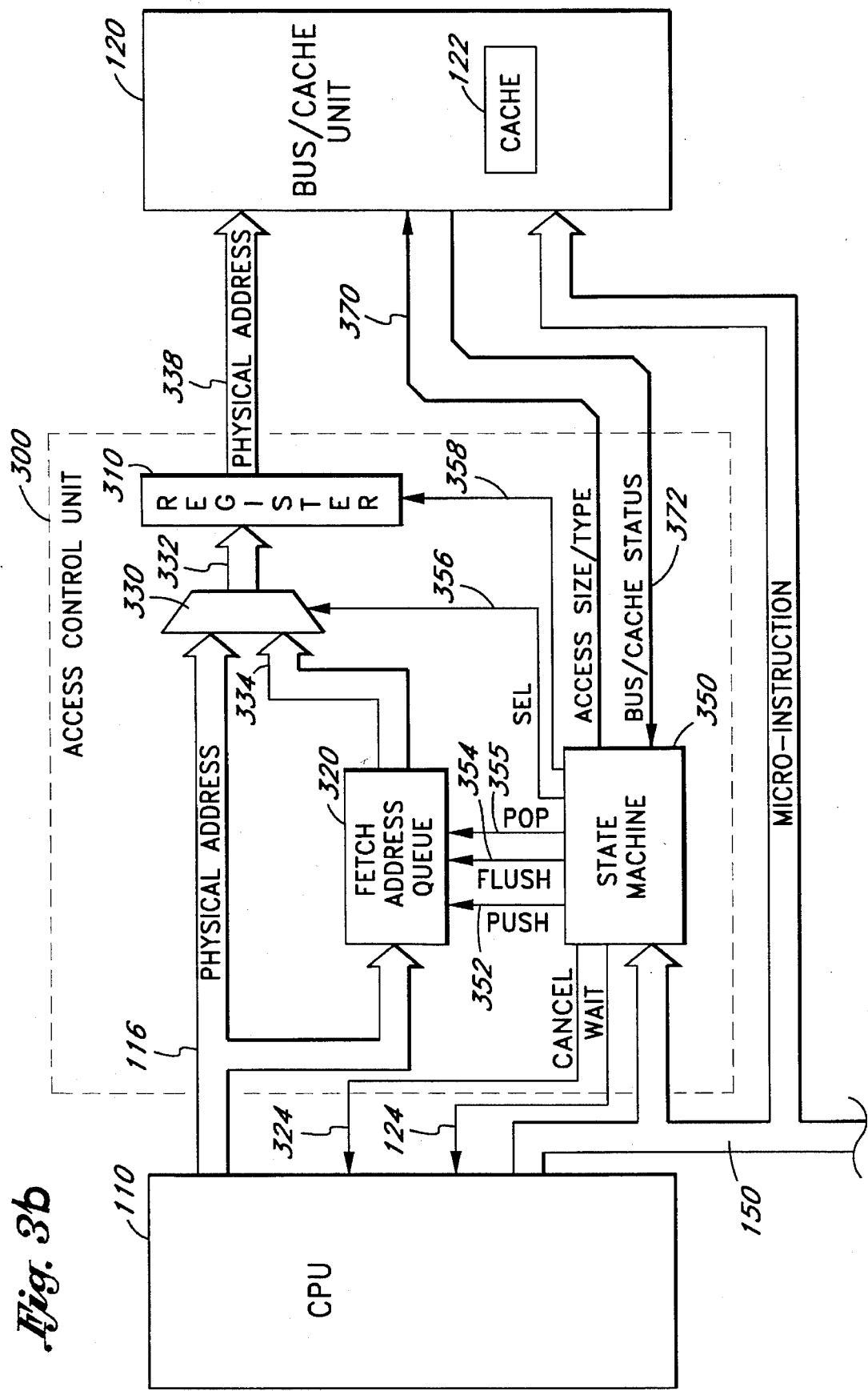

FIG. 3a illustrates a microprocessor 100 in accordance with the present invention. The microprocessor 100 is architecturally identical to the microprocessor of FIG. 1, but includes an access control unit 300 of the present invention for controlling fetch and operand accesses to cache 122 and external memory 140. FIG. 3b is a high-level block diagram that illustrates one embodiment of the access control unit 300.

Referring to FIG. 3b, the access control unit 300 includes an address register 310 ("register"), a fetch address queue 320, a multiplexer 330, and a state machine 350. In the preferred embodiment the fetch address queue 320 is a push and pop first-in-first-out buffer that can hold a maximum of two addresses. The address bus 116 is connected as a first input to the multiplexer 330, and is connected as an input to the fetch address queue 320. The output of the fetch address queue 320 is connected as a second input to the multiplexer 330 by a bus 334. The output of the multiplexer 330 is connected as an input to the register 310 by a bus 332. The output of the register 310 is connected to the bus/cache unit 120 by a bus 338.

The state machine 350 is connected to the CPU 110 by the micro-instruction bus 150, allowing the state machine 150 to receive memory access commands (i.e, fetch requests and operand access requests). The state machine 350 provides a WAIT signal to the CPU 110 on the line 124 for suspending the operation of the CPU 110. The state machine 350 provides a CANCEL signal to the CPU 110 on the line 324 for canceling a fetch request issued by the CPU 110. The state machine 350 provides a PUSH signal to the fetch address queue 320 on a line 352 for pushing selected physical addresses into the fetch address queue 320. The state machine 350 provides a FLUSH signal to the fetch address queue 320 on a line 354 for flushing the fetch address queue 320. The state machine 350 provides a POP signal to the fetch address queue 320 on a line 354 for popping (i.e., effectively removing) a physical address from the fetch address queue 320. The state machine 350 provides select (SEL) control signal on a line 356 to control the multiplexer 330. The state machine 350 provides a latch enable signal to the register 310 on a line 358, for loading physical addresses appearing on the bus 332 into the register 310. The state machine 350 provides access size and type information to the bus/cache unit 120 on the lines 370. The state machine 350 receives bus/cache status information from the bus/cache unit 120 on the lines 372.

The state machine 350 has internal registers (not shown) for keeping track of the status of pending fetch requests that have been postponed. These registers indicate how many fetch addresses are in the fetch address queue 320. These registers additionally indicate whether or not a cache miss has occurred for each fetch address in the fetch address queue 320, allowing unnecessary cache attempts to be avoided when postponed fetch requests are attempted.

The general operation of the access control unit 300 of the present invention will now be described. A detailed description will then be provided with reference to FIGS. 4a, 4b, 4c and 4d.

The general purpose of the access control unit 300 is to separate fetch requests from operand access requests, and to postpone fetch requests that cannot immediately be performed. Fetch addresses for postponed fetch requests are stored in the fetch address queue 320 until either performed or canceled. Operand access requests are given priority over postponed fetch requests so that the operation of the CPU 110 is not unnecessarily suspended by pending fetch requests. Postponed fetch requests are attempted on every clock cycle for which no operand access request is pending.

Referring to FIG. 3b, the state machine 350 routes physical addresses appearing on the address bus 116 through the access control unit 300 using the control lines 352, 354 356 and 358. Physical addresses are routed differently depending upon the type of access being performed (as indicated by micro-instructions on the bus 150), the status of the fetch address queue 320 (i.e., whether the fetch address queue 320 is currently empty, full, or neither full nor empty), and the status of the cache 122 and the external bus 142 (as indicated by the BUS/CACHE STATUS lines 372). The cache 122 may be busy for any of a number of reasons. For example, the bus/cache unit 120 may be in the process of performing a cache line fill, a cache flush, or a cache invalidate cycle. The bus 142 to the memory 140 (FIG. 3A) similarly may be busy for a variety of reasons. For example, an operand access may be in progress, or the bus 142 may be locked or on hold.

On every clock cycle for which the CPU 110 issues a memory access command, the corresponding physical address is loaded into the fetch address queue 320, provided that the fetch address queue 320 is not full. Once a physical address has been loaded into the fetch address queue 320, the state machine 350 can effectively push the address onto the fetch address queue 320 by making the PUSH signal line 352 active. The fetch address queue 320 responds to a PUSH signal on the line 352 by incrementing an internal pointer (not shown). If the state machine 350 does not issue a PUSH signal before the next load of the fetch address queue 320, the physical address will be overwritten.

If the CPU 110 issues a memory access command while the fetch address queue 320 is full, the address on the bus 116 is not loaded into the fetch address queue 320. If this memory access command is a fetch request, the state machine 350 asserts the CANCEL signal line 324 to signal to the CPU 110 that the fetch request has been ignored.

The state machine 350 pushes a fetch address onto the fetch address queue 320 if the fetch request cannot immediately be performed as the result of the cache 122 and/or the bus 142 (FIG. 3a) being busy. Operand addresses are never pushed onto the fetch address queue 320. The fetch address at the front of the fetch address queue 320 (i.e., the fetch address least recently pushed onto the fetch address queue 320), if any, appears on the bus 334 during every clock cycle. The state machine 350 can effectively remove a fetch address from the fetch address queue 320 by making the POP signal line 355 active. The fetch address queue 320 responds to a POP signal by decrementing the pointer to thereby allow the fetch address at the front of the fetch address queue 320 to be overwritten.

The state machine 350 generates a select (SEL) signal on the line 356 to cause the multiplexer 330 to select either a physical addresses on the bus 116, or a fetch address on the bus 334. Physical addresses on the bus 116 correspond to memory access commands that are currently being issued by the CPU 110 ("current memory access commands"). Physical addresses on the bus 334 correspond to fetch requests that have been postponed ("postponed fetch requests"). The physical address selected by the multiplexer 330 appears on the bus 332. The state machine may load the register 310 with this address by providing a latch signal on the line 358.

The register 310 holds a single address for either an operand access request or a fetch request. The state machine 350 loads the register 310 with an address that will be used by the bus/cache unit 120 for an access attempt on the following clock cycle. The address held by this register 310 is provided to the bus/cache unit 120 on the bus 338. The state machine 350 provides the corresponding access type and size information to the bus/cache unit 120 on the lines 370 and 372.

In the preferred embodiment of the microprocessor 100, the CPU 110 generates three different types of fetch requests: pre-fetch requests, conditional fetch requests, and unconditional fetch requests. Conditional fetch requests are received by the access control unit 300 only if the conditional branch is actually taken. All three types of fetch requests can be stored in the fetch address queue 320. However, when a request for a conditional fetch or an unconditional fetch is received from the CPU 110, the state machine 350 issues a FLUSH signal on the line 354 to cancel any existing fetch addresses in the fetch address queue 320. Pending fetches are thereby discarded when a branch to a new program address occurs, minimizing unnecessary fetch operations.

Significantly, once a fetch address has been pushed onto the fetch address queue 320, the CPU 110 releases control over the pending fetch access, and continues to perform other operations including operand accesses. The access control unit 300 performs the pending fetch in the background without unnecessarily suspending the operation of the CPU 110.

If one or more fetch addresses are in the fetch address queue 320 and no operand access is issued by the CPU 110 on the current clock cycle, the fetch address at the front of the fetch address queue 320 (i.e., the address for the fetch least-recently postponed) is loaded into the register 310 and the postponed fetch is attempted. Postponed fetch requests are thereby attempted on every clock cycle for which no operand access is pending (unless a program branch is taken on the current clock cycle, causing the fetch address queue 320 to be flushed).

Figure 4A:
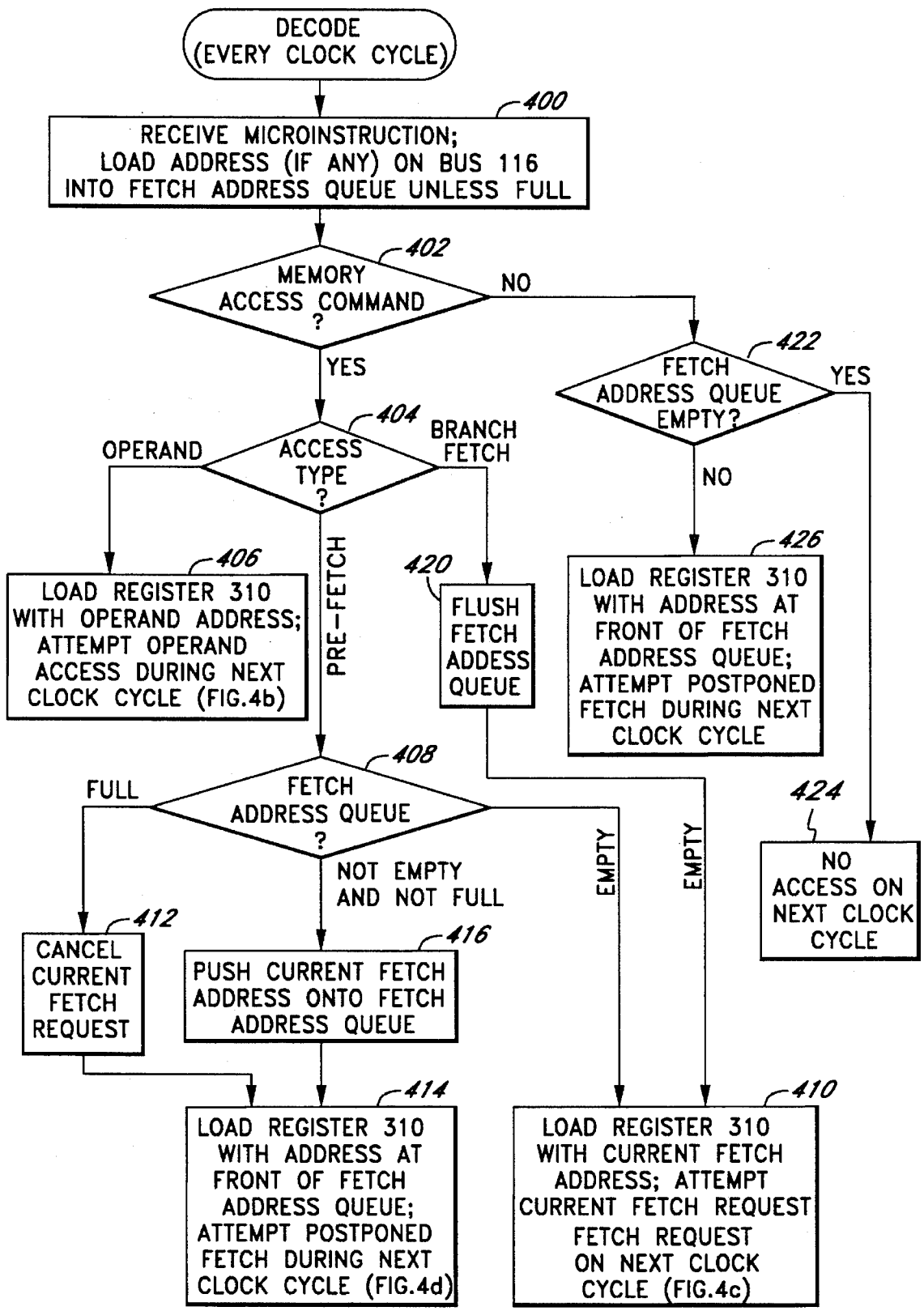
FIG. 4a is a decision tree for the decode logic of the state machine of FIG. 3b.

FIGS. 4a, 4b, 4c and 4d illustrate decision trees for performing fetch and operand accesses in accordance with the present invention. The decision trees represent the logic contained within the state machine 350. The decision tree shown in FIG. 4a represents a decode logic section of the state machine 350 (decode logic not shown). On every clock cycle the decode logic section receives a microinstruction which may or may not specify a memory access command (i.e., a fetch request or an operand access request). Based on the type of request specified (if any) and the state of the fetch address queue 320, this decode logic determines what type of memory access (operand access, current fetch, or postponed fetch), if any, should be attempted on the following clock cycle.

Figure 4B:
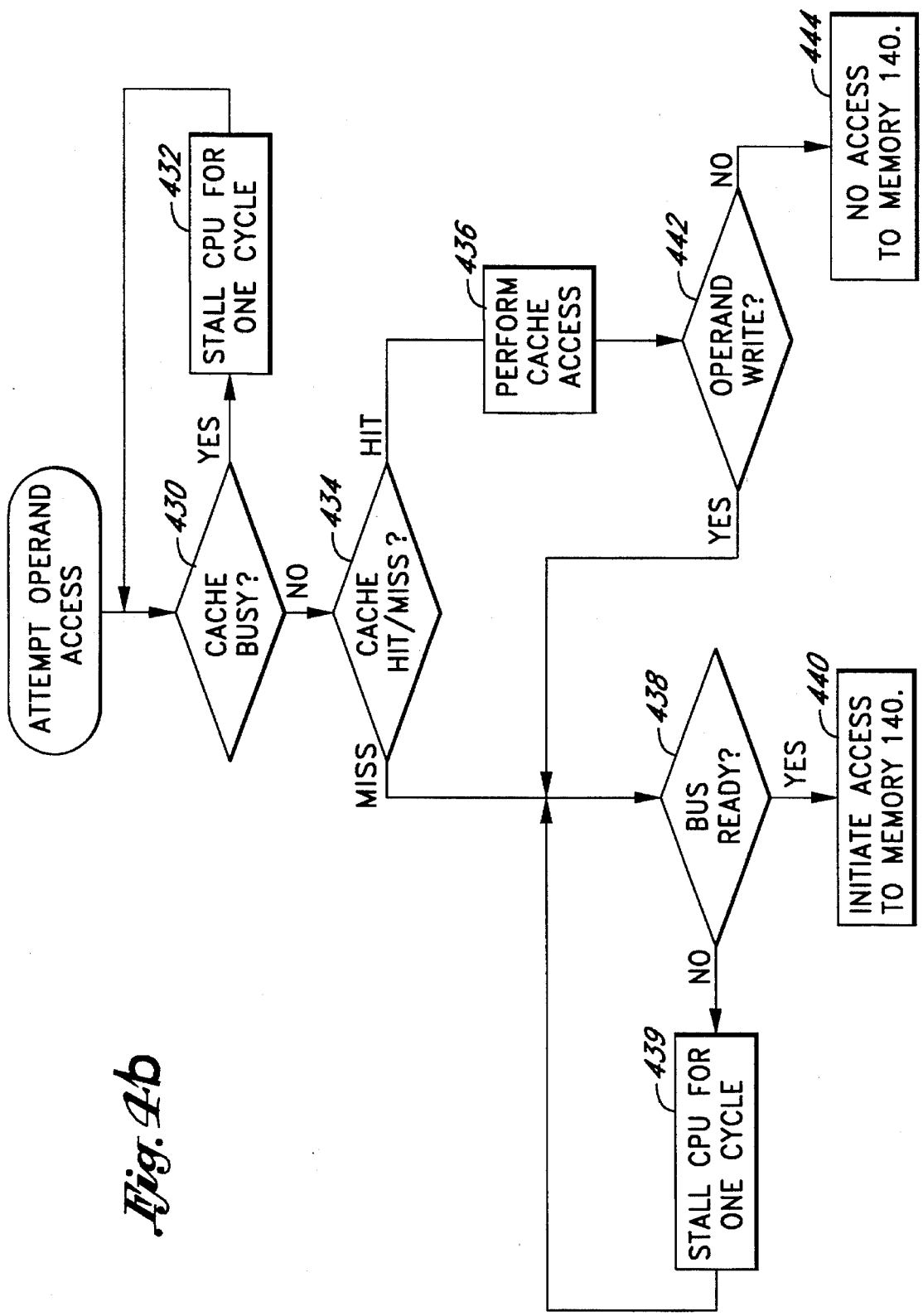
FIG. 4b is a decision tree for the logic of the state machine of FIG. 3b that controls attempts of operand requests.
Figure 4C:
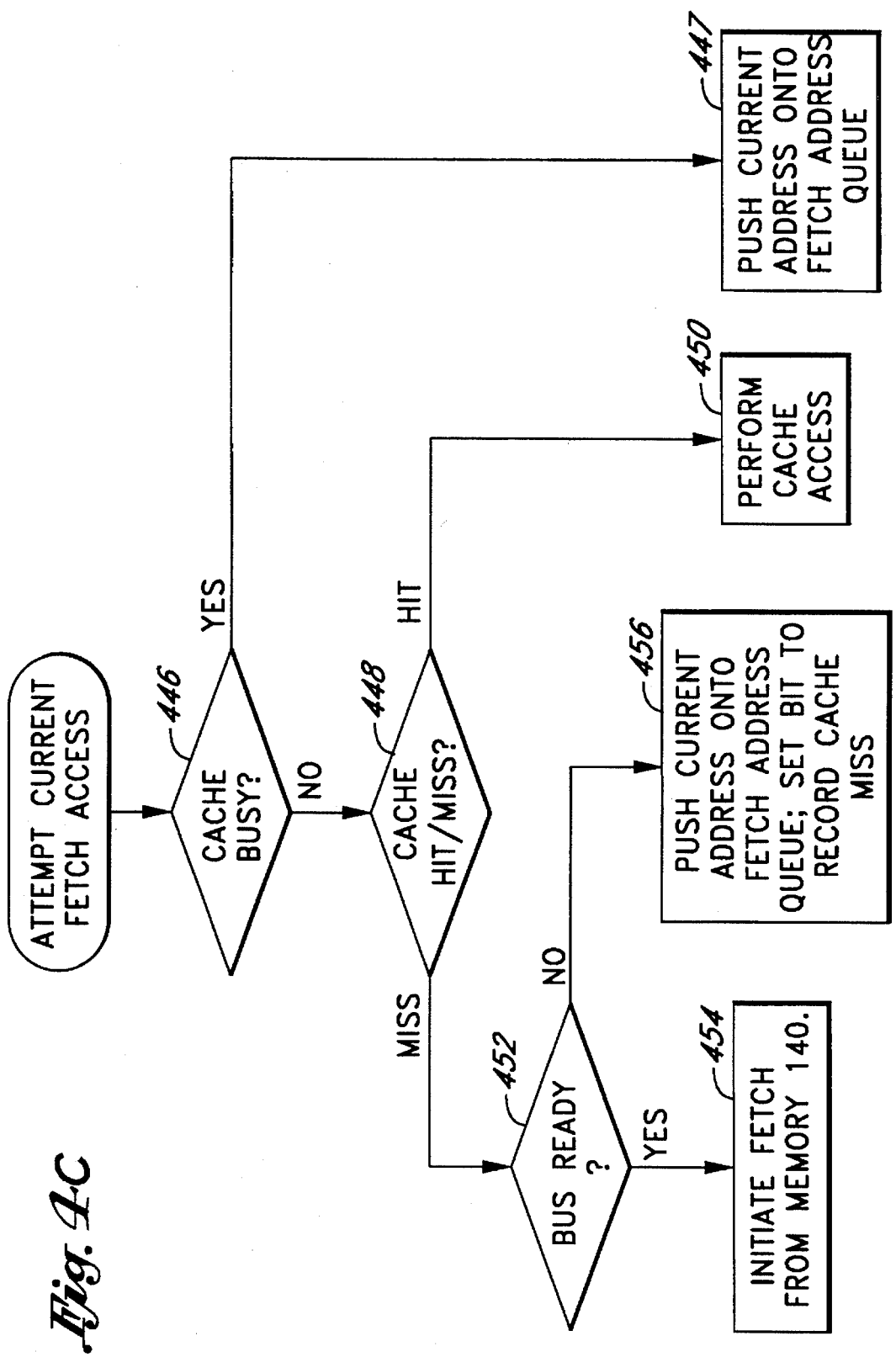
FIG. 4c is a decision tree for the logic of the state machine of FIG. 3b that controls attempts of current fetch requests.

The decision trees of FIGS. 4b, 4c and 4d represent the logic for attempting an operand access, a current fetch request, and a postponed fetch request respectively (logic not shown). These three decision trees represent a pipeline stage which immediately follows the decode logic section (FIG. 4a) of the state machine 350. Thus, the decision tree of FIG. 4a represents decisions made during a memory-access command clock cycle, and the decision trees of FIGS. 4b, 4c and 4d represent decisions made during an access clock cycle which immediately follows the command cycle.

Referring to FIG. 4a, the decode logic of the state machine 350 receives a microinstruction on every clock cycle and loads the address (if any) on the bus 116 into the fetch address queue 320, as indicated by the process block 400. The microinstruction may or may not specify a current memory access command. If a memory access command is specified, the state machine 350 determines the type of access requested, as indicated by the decision blocks 402 and 404. If an operand access request is specified, the state machine 350 routes the physical address on the bus 116 to the register 310, as indicated by the process block 406. This allows the operand access request to be attempted on the following clock cycle (i.e., the access cycle for the macroinstruction being executed). The decision tree for attempting an operand access will be discussed below with reference to FIG. 4b.

If the access type specified is a pre-fetch request, the state machine 350 checks the state of the fetch address queue 320, as indicated by the decision block 408. If the fetch address queue 320 is empty, the state machine 350 routes the address for the current fetch request (i.e., the address on the bus 116) to the register 310, as indicated by the process block 410. On the following clock cycle, the state machine 350 attempts the current fetch request (FIG. 4c).

If the fetch address queue 320 is full in the decision block 408, the state machine 350 cancels the current fetch request, as indicated by the process block 412. To cancel the current fetch request, the state machine 350 asserts the CANCEL line 324 to the CPU 110, and ignores the fetch request specified by the microinstruction. The CPU 110 re-issues the canceled fetch request (if necessary) on a subsequent clock cycle. As indicated by the process block 414, the state machine 350 also routes the fetch address at the front of the fetch address queue 320 to the register 310, so that the corresponding postponed fetch request can be attempted on the following clock cycle (FIG. 4*d*).

If the fetch address queue 320 is neither full nor empty in the decision block 408 (i.e., one fetch address is in the fetch address queue 320 for the preferred embodiment), the state machine 350 pushes the current fetch address onto the fetch address queue 320, as indicated by the process block 416. The state machine 350 also routes the fetch address at the front of the fetch address queue 320 to the register 310, as indicated by the process block 414. The postponed corresponding postponed fetch request is then attempted on the following clock cycle (FIG. 4*d*).

Referring to the decision block 404, if the access type is a branch fetch (i.e., a conditional fetch or an unconditional fetch) the fetch address queue 320 is flushed to cancel all postponed fetch requests, as indicated by the process block 420. As noted above, a conditional fetch request is received by the state machine 350 only if the conditional branch was actually taken. To flush the fetch address queue 320, the state machine 350 asserts the FLUSH signal line 354. As indicated by the process block 410, the state machine 350 also loads the current fetch address (i.e., the address on the bus 116) into the register 310 so that the current fetch request can be attempted on the following access cycle (FIG. 4*c*).

Referring to the decision block 402, if no memory access command is specified by the current microinstruction, the state machine 350 checks the status of the fetch address queue 320, as indicated by the decision block 422. If the fetch address queue 320 is empty, no memory access is attempted on the next clock cycle as indicated by the process block 424. If the fetch address queue 320 is not empty, the state machine 350 loads the fetch address at the front of the fetch address queue 320 into the register 310 as indicated by the process block 426. The corresponding postponed fetch request is then attempted during the next clock cycle.

As indicated by the foregoing, postponed fetch requests are attempted during the following cycle only if no operand access is issued by the CPU 110 during the current clock cycle. Operand access requests are thereby given priority over pending (i.e., postponed) fetch requests. This priority assignment significantly increases performance by allowing pending operand accesses to be performed immediately, without having to wait for pending fetch requests to be performed. It should further be noted that the state machine 350 attempts postponed fetch requests on the first clock cycle for which no operand access request is pending.

The decision tree shown in FIG. 4*b* will now be described. The decision tree shown represents logic of the state machine 350 for attempting an operand access until the access is performed. The operand access is performed using the operand address that was placed in the register 310 during the command clock cycle, as was shown by the process block 406 of FIG. 4*a*. Referring to FIG. 4*b*, the state machine 350 initially checks the state of the cache 122, as indicated by the decision block 430. If the cache 122 is busy, the state machine 350 stalls the CPU 110 for one clock cycle as indicated by the process block 432. The cache may be busy in this situation, for example, as the result of a cache line fill or a cache flush. The state machine 350 stalls the CPU 110 by asserting the WAIT signal line 124. After the one-cycle stall the state machine 350 checks the status of the cache 122 again, and continues to stall the CPU 110 until the cache 122 becomes ready.

Once the cache 122 is ready, the bus/cache unit 120 checks the cache 122 using the address in the register 310, as indicated by the decision block 434. This cache attempt is controlled by a state machine (not shown) of the bus/cache unit 120. This state machine of the bus/cache unit 120 provides feedback to the state machine 350 on the lines 372 to indicate the status of the cache attempt.

If a cache miss occurs, the state machine 350 checks the status of the external bus 142 to memory 140 (FIG. 3*a*) as indicated by the decision block 438. If the bus 142 is not ready the state machine 350 stalls the CPU 110 for one clock cycle, as indicated by the process block 439. The state machine 350 continues to stall the CPU 110 until the bus 142 becomes ready. Once the bus 142 becomes ready, the bus/cache unit 120 initiates an access to the memory 140 as indicated by the process block 440. Once the operand access has been initiated, the access control unit 300 may issue additional memory access commands to the bus/cache unit 120.

Referring to the decision block 434 and the process block 436, if a cache hit occurs the cache access is performed. If the memory access command is an operand read operation, no access is performed to the memory 140, as indicated by the decision block 442 and the process block 444. If the memory access command is an operand write, the state machine writes the operand data to the memory 140 following the cache write (assuming that a write-through cache scheme is used). Thus, the state machine 350 stalls the CPU 110 as described above if the external bus 142 is busy, and performs the operand access once the external bus 142 is ready.

The decision tree shown in FIG. 4*c* will now be described. This decision tree represents the state machine 350 logic for attempting a current fetch request. As indicated by FIG. 4*a*, this logic is exercised if a branch fetch request was issued by the CPU 110 during the previous clock cycle, or if a pre-fetch request was issued during the previous clock cycle and the fetch address queue 320 was empty. In either situation, the fetch address queue 320 is empty when this logic is exercised.

Referring to the decision block 446 of FIG. 4*c*, the state machine 350 initially checks the status of the cache 122. If the cache 122 is busy, the fetch address for the current fetch request is pushed onto the fetch address queue 320, as indicated by the process block 447. The current fetch request is thereby postponed.

If the cache 122 is ready and a cache hit occurs, the current fetch is performed from the cache 122, as indicated by the decision block 448 and the process block 450. If a cache miss occurs the state machine 350 checks the status of the external bus 142, as indicated by the decision block 452. If the external bus 142 is ready, the bus/cache unit 120 initiates the current fetch from the memory 140, as indicated by the process block 454. Once the fetch from the memory 140 has been initiated, it continues until completed. If the external bus 142 is busy, the current fetch address is pushed onto the fetch address queue 320 as indicated by the process block 456. As indicated, the state machine 350 additionally records the cache miss status of the fetch request by setting a bit of a register (not shown) of the state machine 350. This allows subsequent cache attempts to be avoided when the fetch request is re-attempted (from the fetch address queue 320) on a subsequent clock cycle.

As indicated by the foregoing, current fetch requests are attempted, if at all, for a single clock cycle. If the fetch cannot immediately be performed (i.e., the cache 122 is busy, or the bus 142 is busy following a cache miss), the current fetch request is postponed for a later clock cycle. Thus, unlike operand accesses, the CPU 110 is not suspended by the access control unit 300 as current fetch requests are attempted. This results in a significant performance benefit over the prior art.

The decision tree shown in FIG. 4d will now be described. This decision tree represents the logic of the state machine 350 for attempting postponed fetch requests. Postponed fetch requests are attempted using a fetch address from the front of the fetch address queue 320 that was placed in the register 310 during the previous clock cycle (see the process blocks 414 and 426 of FIG. 4a). As indicated by the decision block 460, the state machine 350 initially checks the corresponding cache miss status bit to determine whether a cache miss has occurred on a previous clock cycle. If a prior cache miss has occurred, the state machine 350 checks the status of the external bus 142 as indicated by the decision block 462. If the external bus 142 is ready, the postponed fetch is initiated from the memory 140 and the fetch address is popped from the fetch address queue 320, as indicated by the process blocks 464 and 466.

If a prior cache miss has occurred and the external bus 142 is currently busy, the fetch request is further postponed as indicated by the process block 470. In this situation, the fetch address remains at the front of the fetch address queue 320.

Referring to the decision blocks 460 and 472 and the process block 474, if a prior cache miss has not occurred and the cache 122 is currently busy, the postponed fetch request is further postponed. If the cache 122 is not busy in the decision block 472, the bus/cache unit 120 checks the cache 122 for the requested fetch data, as indicated by the decision block 480. If a cache miss occurs, the state machine 350 performs the above-described sequence illustrated by the decision block 462 and the process blocks 464, 466 and 470. As indicated by the process block 470, the state machine 350 sets a bit to record that a cache miss has occurred if the fetch is further postponed. If a cache hit occurs in the decision block 480, the fetch data is retrieved from the cache 122 (during the current clock cycle) and the fetch address is popped, as indicated by the process blocks 484 and 488.

As indicated by the foregoing, postponed fetch requests are attempted for a single clock cycle. If the postponed fetch request cannot immediately be performed (i.e., cache 122 is busy, or the bus 142 is busy following a cache miss), the postponed fetch request is further postponed and the address remains at the front of the fetch address queue 320.

The logic for the state machine 350 follows directly from the decision trees of FIGS. 4a, 4b, 4c and 4d. Those skilled understand how to combine combinational and sequential logic elements to implement the state machine 350 as described. It will also be recognized that the logic for checking the status of the cache 122 can simply be disabled or overridden when the cache 122 is disabled.

FIG. 5 illustrates the operation of the above-described access control unit 300 of FIGS. 3a and 3b for an example sequence of memory access commands. The sequence of memory access commands illustrated is similar to the sequence shown by FIG. 2, with the addition of an operand write request during the third clock cycle $T_3$. Referring to FIG. 4, during the first clock cycle $T_1$ the CPU 110 issues a pre-fetch request. Assuming the fetch address queue 320 is empty during the first clock cycle $T_1$, the corresponding fetch address is latched by the register 310 so that the current fetch request can be attempted during the following clock cycle (see the process block 410 of FIG. 4a). The fetch address is also loaded into the fetch address queue 320 so that it may be pushed onto the fetch address queue 320 if necessary.

During the second clock cycle $T_2$, the bus/cache unit 120 checks the cache 122 and determines that the requested fetch data is not in the cache 122 (cache miss). Since the external bus 142 is busy during this clock cycle $T_2$, the state machine 350 pushes the current fetch address onto the fetch address queue 320 (see the process block 456 of FIG. 4c). The current fetch request is thereby postponed. The state machine 350 also sets a cache miss status bit for the postponed fetch request.

Also during the second clock cycle $T_2$, the CPU 110 issues an operand read request to the access control unit 300. During this cycle $T_2$, the decode logic of the state machine 350 determines that the operand read request will be attempted during the next clock cycle, and loads the corresponding operand address into the register 310 (see the process block 406 of FIG. 4a).

During the third clock cycle $T_3$, the bus/cache unit 120 attempts the operand read (FIG. 4b) and finds the requested operand data in the cache 122. Also during the third clock cycle $T_3$ the CPU 110 issues an operand write request. The decode logic (FIG. 4a) of the state machine 350 determines that the operand write request will be attempted during the next clock cycle and loads the corresponding operand address into the register 310 (see the process block 406 of FIG. 4a).

During the fourth clock cycle $T_4$, the operand write is attempted and a cache hit occurs. Since the microprocessor 100 implements a write-through caching scheme, the state machine 350 checks the state of the external bus 142. Since the external bus 142 is busy, the state machine 350 stalls the CPU 110 until the operand access can be performed (see the decision block 438 and the process blocks 439 and 440 of FIG. 4b).

Since no memory access command is issued by the CPU 110 during the fourth clock cycle $T_4$, and the fetch address queue 320 is not empty, the decode logic of the state machine 350 (FIG. 4a) determines that the postponed fetch request should be attempted during the following clock cycle $T_5$ and loads the fetch address at the front of the fetch address queue 320 into the register 310.

During the fifth clock cycle $T_5$, the state machine 350 attempts the postponed fetch (FIG. 4d). Since a prior cache miss has occurred for the postponed fetch, the state machine 350 ignores the state of the cache 122 and checks the state of the external bus 142 (see the decision blocks 460 and 462 of FIG. 4d). Since the external bus 142 is busy, the postponed fetch is further postponed and the fetch address is not popped from the fetch address queue 320 (see the process block 470). Since no memory access command is issued during the fifth clock cycle $T_5$ and the fetch address queue 320 is not empty, the decode logic (FIG. 4a) of the state machine 350 determines that the postponed fetch request should again be attempted during the next clock cycle $T_6$.

During the sixth clock cycle $T_6$, the postponed fetch request is again further postponed since the external bus 142 is still busy. The decode logic of the state machine 350 again determines that the postponed fetch request should be attempted during the next clock cycle $T_7$.

During the seventh clock cycle $T_7$, the state machine 350 determines that the external bus 142 has become free and thus initiates the fetch from the memory 140 (see the process block 464 of FIG. 4d). Also during the seventh clock cycle $T_7$, the state machine 350 pops the fetch address from the fetch address queue 320 to effectively delete the fetch address. Once initiated, the fetch access continues until completed.

The performance benefits achieved by use of the access control unit 300 can be seen by comparing FIG. 2 (prior art) and FIG. 5. As illustrated by FIG. 5, the use of the access control unit 300 permits the CPU 110 to execute operand-access instructions while a fetch request is pending. In contrast to the situation illustrated in FIG. 2, operand accesses to the cache 122 and/or the memory 140 are not unnecessarily suspended by pending fetch requests. Fetch requests are performed by the bus/cache unit 120 once the cache 122 and/or the external bus 142 become free. Usage of the cache 122 and the external bus 142 is thereby optimized.

As should be apparent from the foregoing, the access control unit 300 grants priority to operand access requests over pending fetch requests. Although the general effect is to reduce interference between fetch requests and operand access requests, this method of giving priority to operand access requests may increase the likelihood that the instruction buffer 130 (FIG. 3a) will become depleted. The effect of instruction depletion can be reduced by designing the microprocessor 100 to execute instructions obtained from fetches that are currently in progress. In the preferred embodiment, for example, the bus/cache unit 120 returns fetch data to the instruction buffer 130 in 32-bit blocks (or 64-bit blocks if fetched from cache 122) as the fetch data becomes available. The instruction buffer 130 assembles the instructions as they are received so that they may be passed to the CPU 110 for execution (if necessary) without waiting for the bus/cache unit 120 to complete the fetch operation. The length of time during which the operation of the CPU 110 is suspended is thereby minimized.

An alternative embodiment of the access control unit 300 of the present invention will now be described with reference to FIG. 6. FIG. 6 illustrates an embodiment of the microprocessor 100 and the access control unit 300 of FIGS. 3a and 3b which includes additional logic for handling exception status information generated during fetch requests. To simplify the drawing, the state machine 350 (and associated control and input lines) and the micro-instruction bus 150 are omitted.

Referring to FIG. 6, a fetch-exception detect circuit 500 is connected to the address bus 116. The output of the fetch-exception detect circuit 600 is connected to the fetch address queue 320 by a bus 610, allowing exception status information to be passed to the fetch address queue 320. The fetch address queue 320 is now shown as holding both fetch addresses and corresponding exception status data. The bus 610 is also connected to a multiplexer 630.

The multiplexer 630 selects between the bus 610 and an output 640 of the fetch address queue 320, allowing the fetch address queue 320 to be bypassed when fetch requests are performed without being postponed. The output of the multiplexer 630 is connected to the instruction buffer 130 by a bus 632, allowing exception status data to be passed to the instruction buffer 130. A second bus 634 is connected between the instruction buffer 130 and the CPU 110, allowing exception status data to be passed to the CPU 110 with corresponding instructions.

The operation of the circuit of FIG. 6 will now be described. The fetch-exception detect circuit 600 monitors fetch addresses appearing on the address bus 116 and performs one or more exception checks on such addresses. The types of exception checks which may be performed include, but are not limited to, breakpoint checks, limit error checks, page fault checks and alignment error checks. The events which trigger these types of exceptions and the circuitry for performing the associated address comparisons are well understood by those skilled in the art, and will not be described in detail herein.

When the CPU 110 issues a fetch request, the fetch exception detect circuit 600 generates one or more exception status bits for each of the sixteen addressable byte locations specified by the fetch address on the address bus 116. The number of exception status bits generated depends upon the number of types of exception checks performed. For fetch addresses that are placed in the fetch address queue 320, corresponding exception status data generated by the fetch-exception detect circuit 600 are stored by the fetch address queue 320 as indicated. The fetch address queue 320 maintains the exception status data with the associated fetch addresses until the addresses are either issued to the bus unit 120 or canceled. For fetch addresses that are not postponed, the multiplexer 630 selects the bus 610, allowing the corresponding exception status to be passed directly to the instruction buffer 130 without passing through the fetch address queue 320.

As fetch requests are performed by the bus/cache unit 120, the corresponding exception status data is passed from the access control unit 300 to the instruction buffer 130 on the bus 632. The instruction buffer 130 holds the exception status data with the corresponding instructions until the instructions are either executed or canceled. For instructions that are executed, the instructions and corresponding exception status data are passed to the CPU 110 on the busses 134, 634 during the same clock cycle. The CPU 110 evaluates the exception status data for each instruction received, and determines whether or not an exception should be taken. Thus, exceptions detected are taken, if at all, upon execution of the of the exception-causing instruction.

Although the access control unit 300 of the present invention has been described as being located functionally "downstream" in a microprocessor pipeline from an addressing unit 112 and a paging unit 114, it should be understood that this is not a requirement of the present invention. For example, the access control unit 300 can be functionally located ahead of a paging unit. In such a situation, the addresses routed through the access control unit 300 would be virtual addresses, which would be translated into physical addresses after passing through the access control unit 300. Similarly, the addresses routed through the access control unit 300 can be in the form of offsets, to which a base address must be added to produce a physical address. The nature of the benefits achieved by such alternative embodiments of the present invention would be the same as described above.

It should further be understood that the embodiments of the access control unit 300 and the corresponding methods for performing fetch requests have been presented by way of example only, and are not intended to limit the scope of the invention. Thus, the breadth and scope of the present invention should be defined only in accordance with the following claims and their equivalents.

What is claimed is:

1. In a microprocessor in which a central processing unit (CPU) issues fetch requests and operand access requests to a bus unit to initiate accesses to memory, each of said fetch requests including a fetch address which specifies a starting memory location for fetching a block of code into an instruction buffer of said microprocessor, each of said operand access requests including an operand address which specifies a memory location for performing an operand access, an access control unit that postpones pending fetch requests issued by said CPU to allow subsequently-issued operand access requests from said CPU to be performed by said bus unit prior to said pending fetch requests, to thereby increase the performance of said microprocessor, said access control unit comprising:

a fetch address queue that receives and holds a fetch address of a fetch request that has been issued by said CPU, said fetch address queue thereby allowing said fetch request to be postponed while a subsequently-issued operand access request is performed by said bus unit, said subsequently-issued operand access request issued by said. CPU subsequent to said fetch request;

an address selector that selects between at least an operand address from said CPU and said fetch address held by said fetch address queue, said operand address from said CPU corresponding to said subsequently-issued operand access request, an address selected by said address selector being provided to said bus unit and specifying a next memory access request to be attempted by said bus unit; and a state machine that provides a control signal to said address selector to select either said operand address from said CPU or said fetch address held by said fetch address queue, to thereby allow either said subsequently-issued operand access request or said fetch request to be attempted by said bus unit.

2. The access control unit as defined in claim 1, wherein said state machine further provides a second control signal to said fetch address queue, said second control signal allowing said state machine to place a fetch address for a fetch request into said fetch address queue to thereby postpone the processing of said fetch request by said bus unit.

3. The access control unit as defined in claim 1, wherein said state machine grants priority to an operand access request issued by said CPU over a pending fetch request that was issued by said CPU prior to said operand access request.

4. The access control unit as defined in claim 1, wherein said state machine grants priority to operand access requests issued by said CPU over pending fetch requests that have been postponed.

5. The access control unit as defined in claim 1, wherein said state machine further provides a flush signal to said fetch address queue, said flush signal allowing said state machine to flush the contents of said fetch address queue to thereby cancel a pending fetch request that has been postponed.

6. The access control unit as defined in claim 1, wherein said fetch address queue holds at least two fetch addresses so that at least two fetch requests can concurrently be held in a postponed state.

7. The access control unit as defined in claim 1, further comprising a fetch-exception detect circuit that performs exception checks on said fetch addresses issued by said CPU and that generates fetch-exception status data in response to said exception checks, and wherein fetch addresses of postponed fetch requests are held in said fetch address queue in association with corresponding portions of said fetch-exception status data.

8. The access control unit as defined in claim 1, wherein said fetch address held by said fetch address queue is a physical address that uniquely identifies a memory location of an external memory to which said microprocessor is connected.

9. The access control unit as defined in claim 1 combined with an external memory connected to said microprocessor by an external bus, said external memory storing instructions and operand data for said microprocessor.

10. In a microprocessor for which both code and operand data are stored in a common external memory, a fetch address queue that stores fetch addresses to allow corresponding fetch requests issued by a central processing unit (CPU) of said microprocessor to be postponed, said fetch requests specifying respective blocks of said code to be loaded into an instruction buffer of said microprocessor by a bus unit of said microprocessor, said fetch requests being postponed to permit operand access requests issued by said CPU to be performed by said bus unit prior to postponed fetch requests, said fetch addresses being held by said fetch address queue until said corresponding fetch requests are performed or canceled, said fetch address queue thereby allowing said CPU to access operand data without waiting for previously-issued fetch requests to be performed by said bus unit.

11. A fetch address queue as defined in claim 10, wherein a fetch address is placed in said fetch address queue if a corresponding fetch request cannot immediately be performed by said bus unit.

12. A fetch address queue as defined in claim 10, wherein said fetch address queue has a flush input line which allows fetch addresses held by said fetch address queue to be flushed from said fetch address queue if said CPU takes a branch to a new program address, said flush input line thereby allowing postponed fetch requests to be canceled.

13. A method of processing fetch requests and operand access requests issued by a CPU of a microprocessor so as to give priority to pending operand access requests over pending fetch requests, said microprocessor comprising a memory unit which accesses a cache memory and an external memory in response to said fetch requests and said operand access requests, said method comprising the steps of:

(a) receiving a fetch request and a corresponding fetch address from said CPU, said fetch request and said corresponding fetch address identifying a block of code to be loaded into an instruction buffer of said microprocessor from either said cache memory or said external memory;

(b) placing said fetch address in a fetch address queue of said microprocessor to postpone said fetch request if one of:
    said cache memory is busy; or
    said block of code is not in said cache memory and a bus to said external memory is busy;

(c) receiving a current operand access request and a corresponding operand address from said CPU after said step of receiving said fetch request;

(d) passing said operand access request and said corresponding operand address to said memory unit to be performed while holding said fetch address in said fetch address queue, thereby giving priority to said current operand access request over said fetch request; and (e) issuing said fetch address from said fetch address queue to said memory unit, to thereby allow said fetch request to be performed after said current operand access request has been performed.

14. The method as defined by claim 13, wherein said step (e) is performed only when no operand access request has been issued by said CPU that remains pending.

15. The method as defined by claim 13, further comprising the step of flushing said fetch address queue if said CPU branches to a new program address, thereby canceling at least one pending fetch request that has been postponed.

16. The method as defined by claim 13, wherein said cache memory is internal to said microprocessor.

17. In a microprocessor for which code and operand data are stored in a common external memory, and for which portions of said code and operand data are stored in a common cache memory of said microprocessor, a method of performing code fetches and operand accesses such that code fetches do not cause an unnecessary suspension of instruction execution, said method comprising the steps of:

(a) generating a fetch request, said fetch request specifying a block of code to be read into an instruction buffer of said microprocessor from either said external memory or said cache memory;

(b) attempting said fetch request by accessing said cache memory to determine whether said block of code can immediately be read from said cache memory, and, when said block of code cannot immediately be read from said cache memory, placing said fetch request in a state of postponement;

(c) generating an operand access request, said operand access request specifying an operand to be written to or read from said external memory, said step of generating said operand access request occurring after step (a); and (d) performing said operand access request while maintaining said fetch request in said state of postponement, said step of performing said operand access request comprising accessing said external memory.

18. The method as defined in claim 17, further comprising the step of (e) performing said fetch request to load said instruction buffer with said block of code, said step of performing said fetch request occurring after step (d).

19. The method as defined in claim 18, wherein step (e) comprises reading said block of code from said external memory.

20. The method as defined in claim 18, wherein step (e) comprises reading said block of code from said cache memory.

21. The method as defined in claim 18, wherein said step of placing said fetch request in said state of postponement comprises storing a fetch address in a queue, said fetch address specifying a location of said block of code in said external memory.

22. The method as defined in claim 21, wherein step (e) comprises reading said fetch address from said queue.

23. The method as defined in claim 17, further comprising the step of (e) canceling said fetch request when said microprocessor takes a branch, said step of canceling occurring after step (d).

24. The method as defined in claim 17, further comprising the step of (e) canceling said fetch request when said CPU issues either a conditional fetch request or an unconditional fetch request, said step of canceling occurring after step (d).

25. The method as defined in claim 17, wherein said operand access request is an operand write request which requires an operand to be written to each of said cache memory and said external memory.

26. The method as defined in claim 17, wherein step (b) comprises determining that said block of code is not stored in said cache memory.

27. The method as defined in claim 17, wherein step (b) comprises determining that said cache memory is busy.

28. The method as defined in claim 17, wherein step (a) is performed during a first clock cycle of said microprocessor, and wherein steps (b) and (c) are performed during a second clock cycle of said microprocessor, said second clock cycle immediately following said first clock cycle.

* * * * *